United States Patent

Wigren et al.

(10) Patent No.: US 7,848,743 B2
(45) Date of Patent: Dec. 7, 2010

(54) METHODS AND DEVICES FOR UPLINK LOAD ESTIMATION

(75) Inventors: Torbjorn Wigren, Uppsala (SE); Gunnar Peters, Stockholm (SE); Leif Thomas Ostman, Spanga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 716 days.

(21) Appl. No.: 11/814,452

(22) PCT Filed: Jun. 8, 2005

(86) PCT No.: PCT/EP2005/052627

§ 371 (c)(1),
(2), (4) Date: Jul. 20, 2007

(87) PCT Pub. No.: WO2006/076969

PCT Pub. Date: Jul. 27, 2006

(65) Prior Publication Data

US 2009/0088146 A1 Apr. 2, 2009

(30) Foreign Application Priority Data

Jan. 21, 2005 (SE) .................................... 0500199

(51) Int. Cl.
*H04Q 7/20* (2006.01)
(52) U.S. Cl. .................... 455/423; 455/69; 455/522
(58) Field of Classification Search ............. 455/67.11, 455/69, 422.1, 423, 507, 517, 522
See application file for complete search history.

(56) References Cited

U.S. PATENT DOCUMENTS

| 6,996,375 | B2* | 2/2006 | Dent et al. ................ 455/67.16 |
| 7,158,796 | B2* | 1/2007 | Tiedemann et al. ......... 455/453 |
| 2004/0162101 | A1 | 8/2004 | Kim |
| 2004/0165559 | A1 | 8/2004 | Kwak et al. |
| 2005/0013283 | A1 | 1/2005 | Yoon et al. |
| 2005/0054318 | A1* | 3/2005 | Fujii et al. .................. 455/272 |
| 2005/0059408 | A1* | 3/2005 | Tiedemann et al. ...... 455/452.1 |
| 2005/0208952 | A1* | 9/2005 | Dietrich et al. .......... 455/456.1 |

FOREIGN PATENT DOCUMENTS

WO   WO 02/09326 A   1/2002

* cited by examiner

Primary Examiner—Nhan Le (57) ABSTRACT

An inherent non-observability of the thermal noise power level is circumvented by estimating an upper limit of the thermal noise power level by time evaluations. An instantaneous total received wideband power is measured in a receiver. Preferably, also an instantaneous sum of powers of all links used in the same cell is provided. A quantity (P'), preferably the difference between the instantaneous total received wideband power and the instantaneous sum of powers of all links used in the same cell, is followed (110) during a time period ($T_{Lag}$). A minimum value ($P_{MIN}$) of that quantity is then used as an estimate of the thermal noise power level upper limit. Preferably, the time period is configured as a sliding window. An improved determination of noise rise can then be calculated and used for controlling traffic within the cell.

12 Claims, 4 Drawing Sheets

METHODS AND DEVICES FOR UPLINK LOAD ESTIMATION

TECHNICAL FIELD

The present invention relates in general to telecommunication networks and in particular to the field of load estimation in cellular telecommunication networks.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. This is because all users and common channels of a cell transmit in the same frequency band when CDMA technology is used. The load of the cell is directly related to the interference level of the same cell.

In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the Radio Base Station (RBS) are several dBs below the interference level. Despreading in so-called RAKE-receivers then enhances each channel to a signal level where the transmitted bits can be further processed, e.g. by channel decoders and speech codecs later in the signal processing chain.

Since the RBS tries to keep each channel at its specific preferred SIR value, it may happen that an additional user raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the E-UL channel in WCDMA, so that one can insure that instability is avoided. In order to do so, the momentary load must be estimated in the RBS. This enables the assessment of the capacity margin that is left to the instability point.

The load of a cell in a CDMA system is usually expressed as the noise rise, or the rise over thermal (ROT). The exact mathematical definitions will be defined in detail in the description below. Here it is sufficient to state that in order to establish a noise rise estimate the noise floor (ideally thermal noise) and the total power level need to be known. The total power level is easily measured in the receiver. The noise floor is however more difficult to assess. Estimates of the noise floor according to prior art is typically associated with relatively large uncertainties, which even may be in the same order of magnitude as the entire available capacity margin. It will thus be very difficult indeed to implement enhanced uplink channels functionality without improving load estimations connected thereto.

SUMMARY

A general problem with prior art communications networks is that load estimations are presented with an accuracy which makes careful load control difficult. In particular, determination of noise rise in connection with enhanced uplink channels, suffers from large uncertainties, primarily caused by difficulties to estimate the noise floor.

A general object of the present invention is to provide improved methods and arrangements for load estimation. A further object of the present invention is to provide methods and arrangements giving more accurate determination of noise rise. Yet a further object of the present invention is to provide methods and arrangements for improving noise floor estimations.

The above objects are achieved with methods and devices according to the enclosed patent claims. In general words, an inherent non-observability of the thermal noise power level is circumvented by estimating an upper limit of the thermal noise power level by following the time variations. An instantaneous total received wideband power is measured in a receiver. Preferably, also an instantaneous sum of powers of all communication links used in the same cell as the receiver is provided. A quantity derived from the instantaneous total received wideband power, preferably the difference between the instantaneous total received wideband power and the instantaneous sum of powers of all links used in the same cell, is followed during a time period. An extreme value, typically a minimum value, of that quantity is then used as an estimate of the thermal noise power level upper limit. Preferably, the time period is configured as a sliding window. An improved determination of noise rise can then be calculated and used for controlling traffic within the cell.

It is thus an advantage of the present invention that an accurate noise rise estimate is enabled in the RBS, even in presence of neighbour cell interference and external interference sources.

It is a further advantage of the present invention that costly calibrations of front end scale factors in the RBS can be avoided.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present detailed description is introduced by a somewhat deeper discussion about how to perform load estimations and the problems encountered by prior art solutions, in order to reveal the seriousness thereof.

Figure 1:
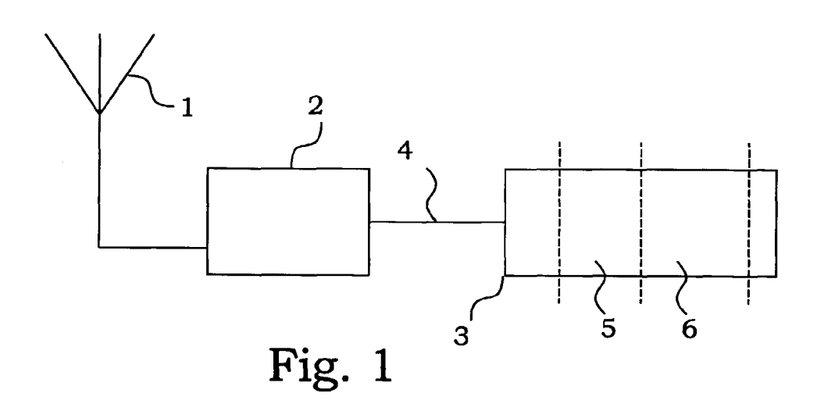
FIG. 1 shows a signal chain of a radio base station performing load estimation.

A typical signal chain of a RBS is depicted in FIG. 1. A received wideband signal from an antenna 1 first passes an analogue signal conditioning chain 2 which consists of cables, filters etc. Variations among components together with temperature drift, render the scale factor of this part of the system to be undetermined with about 2-3 dBs, when the signal enters a receiver 3. In the receiver 3 a number of operations take place. For load estimation it is essential that a total received wideband power is measured at some stage, in FIG. 1 denoted by 5. Furthermore, it is assumed in this embodiment that code power measurements are made available at a stage 6. A reference point for estimated quantities is referred to as 4. The points in the chain where estimated quantities are valid, and where measurements are taken, are schematically shown in FIG. 1.

In the detailed description the following general notations are used:

Measurements of the total received wideband power are performed in the receiver. This measurement is denoted by $P^{Total}(t)$, where t denotes discrete time. The measurement rate is $T^{-1}$ Hz.

Measurement of code power may be performed in the receiver, for all control channels of the serving cell. These measurements are denoted by $P_{i,Measurement}^{Code}(t)$. The measurement rate is $T_i^{-1}$ Hz.

The code power of the data channel i (CS or PS), corresponding to control channel i, is not measured directly. Instead it is slaved to the actual received code signal power as $$P_i^{Code,Data}(t) = n_{Code}(\beta_i^{Data}(t)/\beta_i^{Control}(t))^2$$
$$P_i^{Code,Control}(t) = \eta_i(t) P_i^{Code,Control},$$

where the scale factor $\eta_i(t)$ depends on the service and is known in the receiver at any given instance of time, possibly delayed to after TFCI decoding, $n_{Code}$ denotes the effective number of codes used in the connection.

All sampling periods are such that there is a smallest sampling period so that all other sampling periods are integer multiples of this sampling period.

The quantity that will be used throughout the disclosure is $P_i^{Code}(t)$ that is used to denote the sum of control signal power and data channel power for the total channel i. Note that the measurement $P_{i,Measurement}^{Code}(t)$ measures only the control channel power. Hence in the ideal noise free situation $$P_{i,Measurement}^{Code}(t) = \frac{1}{1+\eta_i(t)} P_i^{Code}(t).$$

Figure 2:
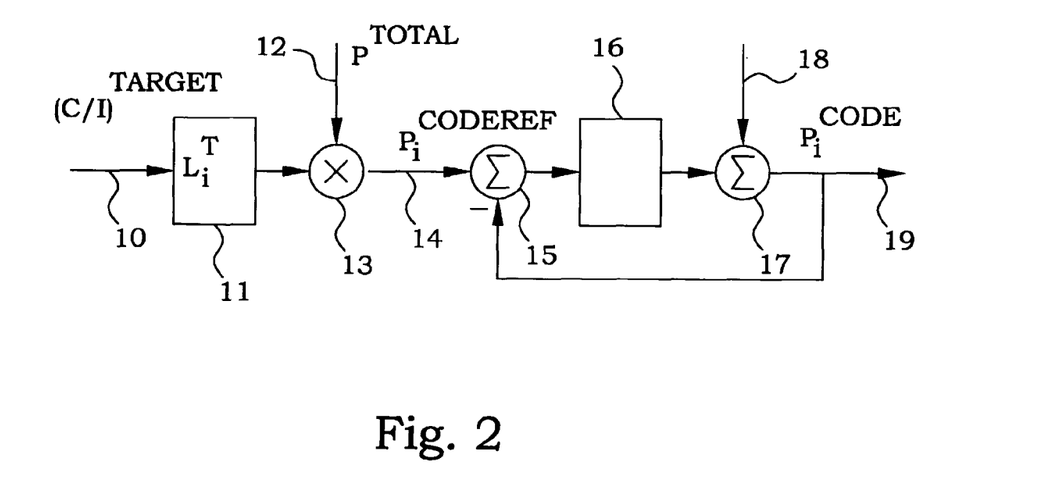
FIG. 2 shows a simplified typical model of power control.

In FIG. 2, a principle of a simple power control loop for a channel i is illustrated. A target 10 for the C/I, denoted as $(C/I)^T$, is provided and based on this, a factor $L_i^T$ is computed 11, which represents the relation between a total power 12, denoted as $P^{Total}$, and a code reference value 14 for the channel, denoted as $P_i^{Code\ Ref}$. Hence, the factor $L_i^T$ is multiplied 13 by the total power 12 to provide the code reference value 14. A used code power is subtracted 15 from the code reference value 14 to achieve any deviation from the desired one and the difference is used as an input to an inner loop controller 16. The inner loop controller operates in order to achieve a zero steady state error. An error term 18 is typically added 17 to an output from the inner loop controller 16, giving the measured output channel power 19 of the channel i, denoted as $P_i^{Code}$. This output power 19 is then used in the feedback to the subtractor 15.

Since the changes in output channel power 19 influences the total power 12, an outer power control loop is also present, connecting all output channel powers and the total power 12.

As indicated in the background section, the result of introducing additional channels becomes an increase of the total power 12. As seen from FIG. 2, an increase in the total power 12 renders an increase in the output channel power 19. Via the outer power control loop, this in turn will increase the total power 12 further. For relatively low loads, and for relatively small additional loads, this control behaviour is typically stable under a certain threshold. However, when passing this threshold, or for very large additional loads, instability may occur.

Figure 3:
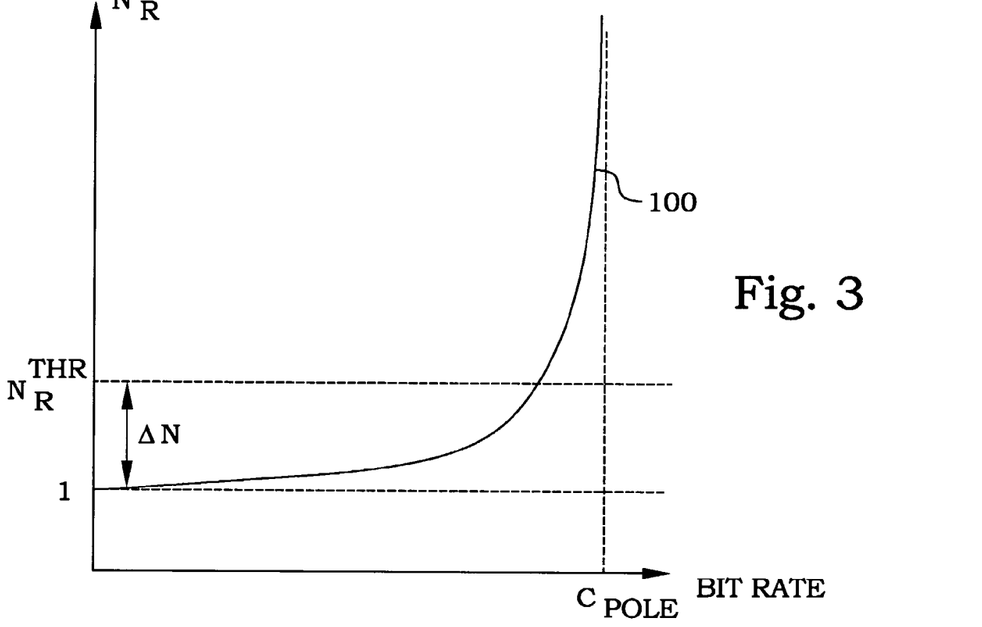
FIG. 3 illustrates a typical relation between noise rise and total bitrate in a cell.

FIG. 3 is a diagram illustrating these conditions. Noise rise $N_R$, defined as the ratio between a total power and the thermal noise level $P_N$ as measured by an antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and planning of additional channels can be performed once the instantaneous noise rise $N_R$ has been determined. The pole capacity, $C_{pole}$, denotes the maximum capacity in bitrate. A typical difference $\Delta N$ between the threshold $N_R^{thr}$ and the level defined by the thermal noise level $P_N$ is typically 7 dB. However, the noise floor or thermal noise level $P_N$ is not readily available. For instance, since scale factor uncertainties in the receiver may be as large as 2-3 dB, a large part of the available margin is affected by such introduced uncertainties.

There are several reasons for the difficulties to estimate the thermal noise floor power. One reason as indicated above is that the thermal noise floor power, as well as the other received powers, is affected by component uncertainties in the analogue receiver front end. These uncertainties also possess a thermal drift.

Another reason concerns that, even if all measurements are made in the digital receiver, the noise floor cannot be directly measured, at least not in the RBS. The explanation is that neighbour cell interference and interference from external sources also affect the receiver, and any mean value of such sources cannot be separated from the noise floor. Note, however, that power measurements on the own cell channels can be performed. Such measurements do however not solve the problem. Yet another reason is that the thermal noise floor is not always the sought quantity. There are situations where constant interference significantly affects the receiver of the RBS. These constant interferers do not affect the stability discussed above, they rather appear as an increased noise temperature, i.e. an increased thermal noise floor.

Unless the above listed problems can be circumvented, there seems to be no other alternative than costly and individual determination of the thermal noise floor in the field, in order to achieve a high enough load estimation performance.

A mathematical approach to the powers and interference measures is presented here below. Powers and interference measures are always defined before de-spreading. If values after de-spreading are sought, a scaling with the spreading factor is needed. Similar scaling can be applied in order to transform quantities to any level of the signal processing chain. In order to be consistent with the above main assumption, the C/I referenced below refers to the C/I before de-spreading. This is reflected by the notation $(C/I)_{chip}$ where the subscript $_{chip}$ refers to the powers at chip rate.

The interference level for the control channel i now obeys $$(C/I)_{chip,i}(t) = \frac{P_i^{Code,Control}(t)}{P^{Total}(t) - P_i^{Code,Control}(t)} \Leftrightarrow$$

$$P_i^{Code,Control}(t) = \frac{1}{1 + \frac{1}{(C/I)_{chip,i}(t)}} P^{Total}(t) \Leftrightarrow$$

$$P_i^{Code}(t) = \frac{1 + \eta_i(t)}{(C/I)_{chip,i}(t)}$$

(1)

Hence, it follows that the load factor $L_i^T(t)$, commanded by the outer power control loop (c.f. FIG. 2), can be expressed as $$L_i^T(t) = \frac{1 + \eta_i(t)}{1 + \frac{1}{(C/I)_{chip,i}^T(t)}}.$$

(2)

Note again that the time index indicates the (slow) outer power control loop update of the relative interference value.

Also note that the corresponding relation between code power and total power before de-spreading, expressed in terms of the SIR value (defined after de-spreading), is $$P_i^{Code}(t) = \frac{1}{N_i} \frac{1 + \eta_i(t)}{1 + \frac{1}{SIR_i(t)}} P^{Total}(t)$$

(3)

where $N_i$ is the spreading factor.

The sought quantity for load estimation is as mentioned earlier typically the noise rise, $N_R(t)$, defined by $$N_R(t) = \frac{P^{Total}(t)}{P_N},$$

(4)

where $P_N$ is the thermal noise level as measured by the antenna connector. It remains to mathematically define what is meant with $P^{Total}(t)$. This relative measure is unaffected of any de-spreading applied. The definition used here is $$P^{Total}(t) = \sum_{i=1}^{N} P_i^{Code}(t) + P^{E+N}(t) + P_N,$$

(5)

also measured at the antenna connector. Here $P^{E+N}(t)$ denotes the power as received from neighbour cells ($^N$) as well as from sources external ($^E$) to the WCDMA system. The major difficulty is here the need to separate the thermal noise power from the interference from neighbour cells.

Figure 4:
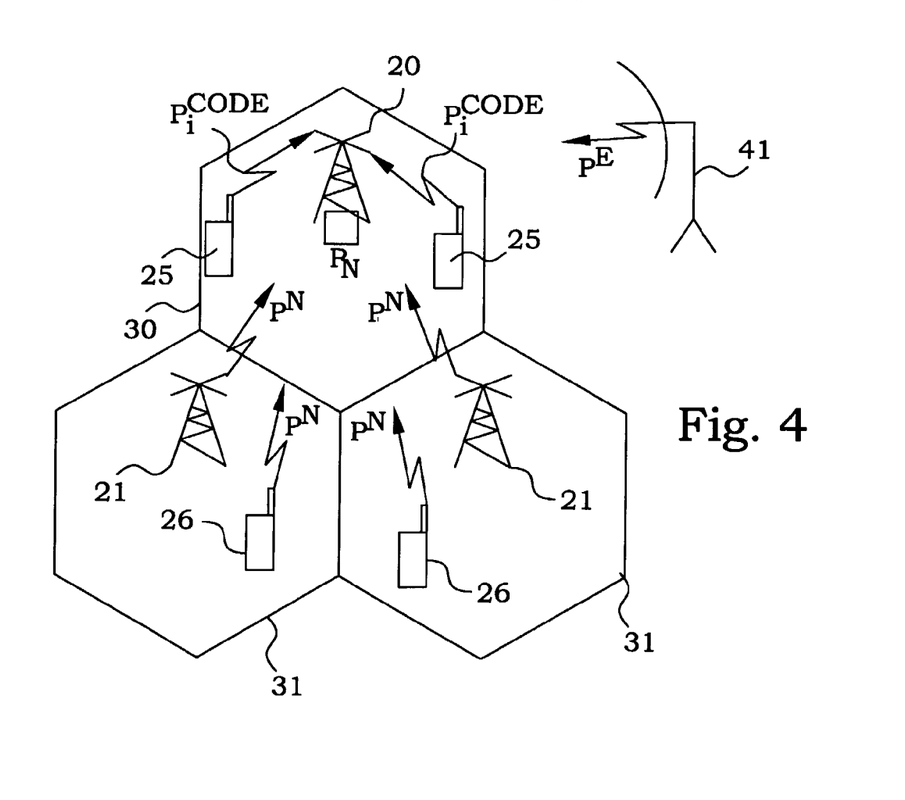
FIG. 4 is a schematic illustration of signal powers occurring in a typical mobile communications network.

FIG. 4 illustrates the contributions to power measurements in connection with an RBS 20. The RBS 20 is associated with a cell 30. Within the cell 30, a number of mobile terminals 25 are present, which communicates with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term arises from the receiver itself.

A specific problem, mentioned briefly above, is that the signal reference points are, by definition, at the antenna connector. The measurements are however obtained after the analogue signal conditioning chain, in the digital receiver. The analogue signal conditioning chain does introduce a scale factor error of 2-3 dB that is difficult to compensate for. Fortunately, all powers of (5) are equally affected by the scale factor error so when (4) is calculated, the scale factor error is cancelled as $$N_R(t) = N_R^{Digital\ Receiver}(t)$$

$$= \frac{P^{Total,\ Digital\ Receiver}(t)}{P_N^{Digital\ Receiver}}$$

$$= \frac{\gamma(t) P^{Total,\ Antenna}(t)}{\gamma(t) P_N^{Antenna}}$$

$$= \frac{P^{Total,\ Antenna}(t)}{P_N^{Antenna}}$$

$$= N_R^{Antenna}(t)$$

It is clear that, unless additional signalling is introduced between the radio base stations, $P^{E+N}(t)$ and $P_N$ are not measurable directly and hence need to be estimated or eliminated in some way.

During periods where $SIR_i^T(t)$, and hence $(C/I)_{chip,i}^T$ is unchanged, and where the power control is operating properly, the received code channel powers for control channels and corresponding steady state data channels should be relatively constant, assuming that the fast power control loop operates efficiently. A suitable dynamic model is then given by the discrete time random walk $$P_i^{Code}(t+T_{min}) = P_i^{Code}(t) + w_i^{Code}(t).$$

(7)

Here $w_i^{Code}(t)$ is assumed to be a zero mean white Gaussian disturbance.

Note that a random walk is a suitable model since the powers are positive quantities. In case a model with a time constant would be included, it follows that also a positive input signal to that model would need to be introduced, and its value estimated. In particular, the random walk is a way to express that the estimated quantity is "almost constant".

On the other hand, in situations where $(C/I)_{chip,i}^T(t)$ changes, e.g. due to poor channel conditions, change of RAB or varying packet traffic, a more general model is needed. Such a model can be included by the introduction of a simple model of the fast power control loop according to FIG. 2.

$(C/I)_{chip,i}^T(t)$ is being updated by the outer power control loop. By multiplying the load factor for the sum of the control and data channel parts of the channel with the total power $P^{Total}(t)$, the code power reference value for the channel, $P_i^{Code\ Ref}(t)$ is obtained.

In this more general case it is suitable to assume that the controller 16 (FIG. 2) contains an integrator operation in order to reach zero steady state error. In case a pure integrator is used, the difference equations for the code powers become $$P_i^{Code}(t+T_{min}) = P_i^{Code}(t) + K(P_i^{Code\ Ref}(t) - P_i^{Code}(t)) + w_i^{Code}(t).$$

(8)

$$P_i^{Code\ Ref}(t) = \frac{1+\eta_i(t)}{1+\frac{1}{(C/I)_{chip,i}^T(t)}} P^{Total}(t), \quad (9)$$

$$i = 1, K, n.$$

Here (1-K) should resemble the true time constant of the fast power control loop. Hence, (7) and (9) constitute two alternatives in the modelling of the control and traffic channels of the cell. Note that the model (9), (10) computes a reference power, as seen in the receiver. This reference power is the same value that the fast power control loop attempts to achieve. Therefore, when a change of $(C/I)_{chip,i}^T(t)$ is commanded, the transient of the power of the channel should be reasonably well modelled. The model is uncertain though, since the bit errors on the power commands make the actual commanded terminal power uncertain. This needs to be captured by the additive system noise of (9).

Since no prior information about the external and neighbour cell power is available, it is natural to model it as a random walk, i.e.

$$P^{E+N}(t+T_{min}) = P^{E+N}(t) + w^{E+N}(t) \quad (10)$$

Also the thermal noise is modelled by a random walk model, but with a very small systems noise $$P_N(t+T_{min}) = P_N(t) + w_N(t) \quad (11)$$

The measurements performed in the digital receiver include the total received wideband power, as well as the received control code powers for all relevant channels in the serving cell. The thermal noise level and the interference from neighbour cells and external sources cannot be directly measured. The code power measurements can be described in either of two ways. The most straightforward way is to use $$P_{i,Measurement}^{Code}(t) = \frac{1}{1+\eta_i(t)} P_i^{Code}(t) + e_i^{Code}(t), \quad (12)$$

$$i = 1, K, n$$

Alternatively, the relation (2) can be exploited by noting that, by (5)

$$P_{i,Measurement}^{Code}(t) = L_i(t) P^{Total}(t) + e_i^{Code}(t) = \quad (13)$$

$$= L_i(t) \left( \sum_{j=1}^{N} P_j^{Code}(t) + P^{E+N}(t) + P_N(t) \right) + e_i^{Code}(t)$$

The total wide band power measurement can be expressed by $$P_{Measurement}^{Total}(t) = \sum_{i=1}^{N} P_i^{Code}(t) + P^{E+N}(t) P_N(t) + e^{Total}(t) \quad (14)$$

It can be mathematically proved that a linear estimation of $P^{E+N}(t)$ and $P_N$ is not an observable problem. Only the sum $P_{E+N} + P_N$ is observable from the available measurements. Since both quantities are positive it is evident that each can not be estimated from the sum of the two.

It also turns out that there is no mathematical modelling available making it possible to eliminate one of $P^{E+N}(t)$ and $P_N$.

Accepting the fact that only the sum $P^{E+N} + P_N$ can be observed from measurements of total wideband power and code powers for all channels, it must be investigated if any useful information still can be deduced. The present invention aims to achieve a solution that circumvents the problems listed above, in particular to circumvent the fundamental problem, that the noise floor is a quantity that is not observable from measurements that can be made available in the RBS, i.e. the problem that there is no conventional estimation technique that can be used to separate the noise floor from power mean values originating from neighbour cell interference and interference sources external to the cellular system. As it turns out, only the sum of the power of the noise floor and the power of the neighbour and external interference can be observed. A simplified way to state this fact is that in case the sum of two (positive) numbers is known, then this information alone is not sufficient to determine each of the two numbers.

According to the present invention, the following therefore describes an approach of re-gaining observability by instead using observations of minimum powers spread in time. The solution according to the present invention is to re-achieve observability by determining the noise floor as the minimum value, over an appropriately selected interval of time, of a quantity derivable from the total received wideband power.

Figure 5:
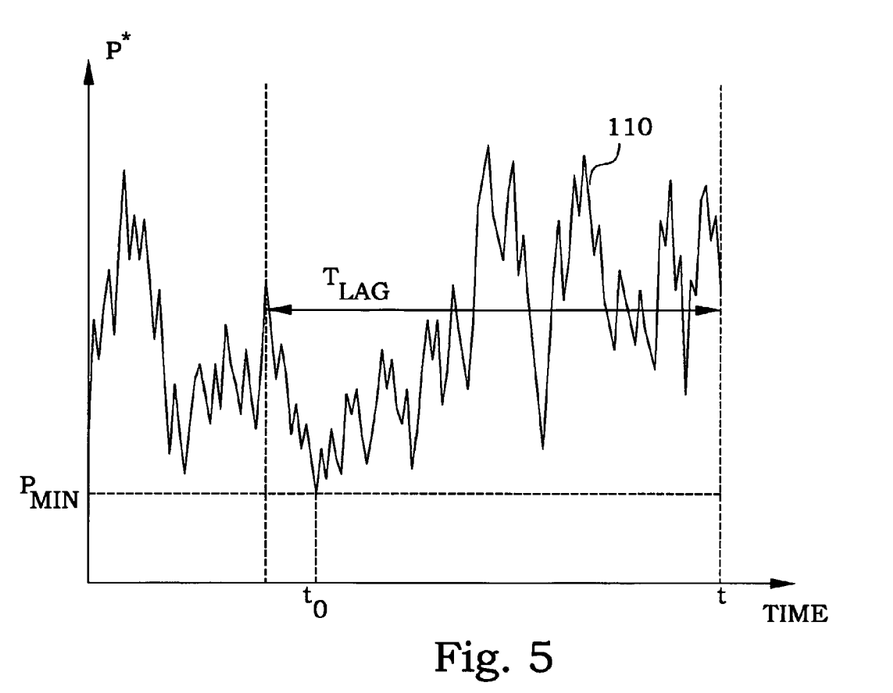
FIG. 5 is a diagram illustrating a typical time variation of a power quantity derived from total received power measurements.

FIG. 5 illustrates a diagram showing time variations 110 of a total power-related quantity. In a typical case, the total power-related quantity P* is a representation of the total power itself or a difference between the total power and the sum of the code powers. During some time intervals, the total power-related quantity presents high values, corresponding e.g. high traffic load periods. However, at some occasions, the total power-related quantity becomes small, indicating that many of the usual contributions to the total power are absent.

It is seen from the example of FIG. 1, that a minimum value $P_{MIN}$ appears at a time $t_0$. From this, it can be concluded that the contribution of $P_N$ cannot be larger than $P_{MIN}$, since all contributions to the total power are positive quantities and $P_N$ is considered to be essentially constant. $P_{MIN}$ is therefore an upper limit of the $P_N$.

The time logging is preferably made within a certain time window ending at the present time and having the duration of $T_{Lag}$. By selecting the duration $T_{Lag}$ properly, the quantity $$\min_{t' \in [T-T_{Lag}, t]} P^*(t')$$

becomes a useful estimate of $P_N$.

For instance, assume that the followed quantity is $$P^{Total}(t) - \sum_{j=1}^{N} P_j^{Code}(t).$$

This will according to (5) correspond to $P^{E+N}(t) + P_N(t)$. Considering the fact that the load of the system normally varies with the time of day, it could be conjectured that $P^{E+N}(t)$ should be very small during certain periods of time. If so, $$\min_{t' \in [T-T_{Lag}, t]} \left( P^{Total}(t') - \sum_{i=1}^{N} P_i^{Code}(t') \right)$$

could be a useful estimate of $P_N(t)$ provided that the lag $T_{Lag}$ is chosen large enough, so as to allow for very small values of $P^{E+N}(t)$ to occur within $[t-T_{Lag}, t]$. Note that temperature variations that affect the scale factor within $T_{Lag}$ will introduce errors in this procedure. The fix variations between components in the analogue signal conditioning chain can be compensated for though.

In a preferable embodiment the suggested solution assumes that all measurements of the load of the cell are performed in the digital receiver. As seen from the mathematical evaluation above, this approach has the potential to compensate at least for scale factor errors that do not drift rapidly.

As mentioned above, a simplified alternative is to estimate $$\min_{t' \in [T-T_{Lag}, t]} P^{Total}(t').$$

As compared to the estimation of $$\min_{t' \in [t-T_{Lag}, t]} \left( P^{Total}(t') - \sum_{i=1}^{N} P_i^{Code}(t') \right),$$

this approach can be conjectured
- to have a lower computational complexity since code power measurements are not exploited;
- to have worse performance since fast serving cell power changes due e.g. to bursty data traffic;
- to have worse performance in cells where the load is not likely to be low during any hour, but where the surrounding cells are likely to have a low load with a higher likelihood.

Once $$\min_{t' \in [t-T_{Lag}, t]} P^{Total}(t')$$

or $$\min_{t' \in [t-T_{Lag}, t]} \left( P^{Total}(t') - \sum_{i=1}^{N} P_i^{Code}(t') \right)$$

has been established, typically in the RBS, the load estimate, i.e. typically the noise rise $N_R(t)$, follows by a division of $P^{Total}(t)$ with either of these quantities.

In a more general case, the quantity that is followed in time can be a quantity dependent on the total power according to different relations. Dependent on the actual relation used, an extreme value is traced, typically either a minimum or a maximum value. From this extreme value, a minimum of the total power or the difference between the total power and the sum of the code powers can be computed, from which a corresponding treatment as presented above is performed.

Figure 6:
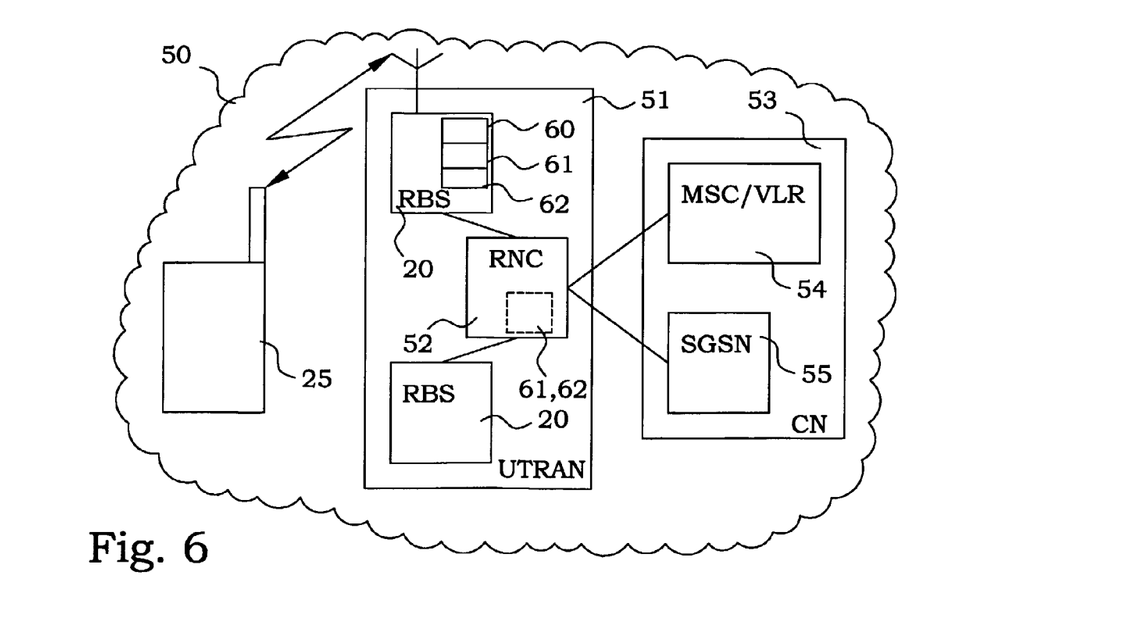
FIG. 6 is a block diagram of main parts of an embodiment of a system according to the present invention.

In the description above, it is assumed that the power estimations concern uplink communication. The power measurements are in such cases performed by a node in the radio access network or in the core network, typically the radio base station. However, at least parts of the procedure, e.g. the determining and/or estimating steps may also be performed in other parts of the communication network, e.g. a radio network controller. FIG. 6 illustrates main parts of an embodiment of a system according to the present invention. A wireless communications system 50 comprises a Universal mobile telecommunication system Terrestrial Radio Access Network (UTRAN) 51. A mobile terminal 25 is in radio contact with a RBS 20 in the UTRAN 51. The RBS 20 is controlled by a Radio Network Controller (RNC) 52, which in turn is connected to a Mobile services Switching Centre/Visitor Location Register (MSC/VLR) 54 and a Serving General packet radio system Support Node (SGSN) 55 of a core network CN 53.

In this embodiment, the RBS 20 comprises means for obtaining measurements 60 of instantaneous total received wideband power, means for determining 61 an extreme value of the power quantity being described above, and means for estimating 62 an upper limit of a thermal noise power level. These means 60-62 can be implemented as separate units or as at least partly integrated units.

In an alternative embodiment, the means 61-62 are instead comprised in the RNC 52, as indicated by the dashed box in FIG. 6. At least a part of the measuring means 60 remains typically in the RBS 20 due to the proximity of the antenna. Also other alternative configurations of the means 60-62 are possible, as anyone skilled in the art realizes.

The description above is assuming an implementation for CDMA and WCDMA systems. These are the types of systems, in which the present invention presently is believed to be most advantageous. However, the technique may also be applicable to other systems as well. If other multiple access divisional methods are used, code related discussions above then may be replaced with e.g. frequency or time related analogues.

In most discussions, uplink communication is discussed, in particular in connection with enhanced uplink channels applications. The power estimations will then be used to compute an estimate of an instantaneous noise rise as a ratio between the instantaneous total received wideband power and the estimated upper limit of the thermal noise power level. This noise rise can then be used for controlling the traffic in the cell. Corresponding means are provided, preferably in the RBS or RNC.

Figure 7:
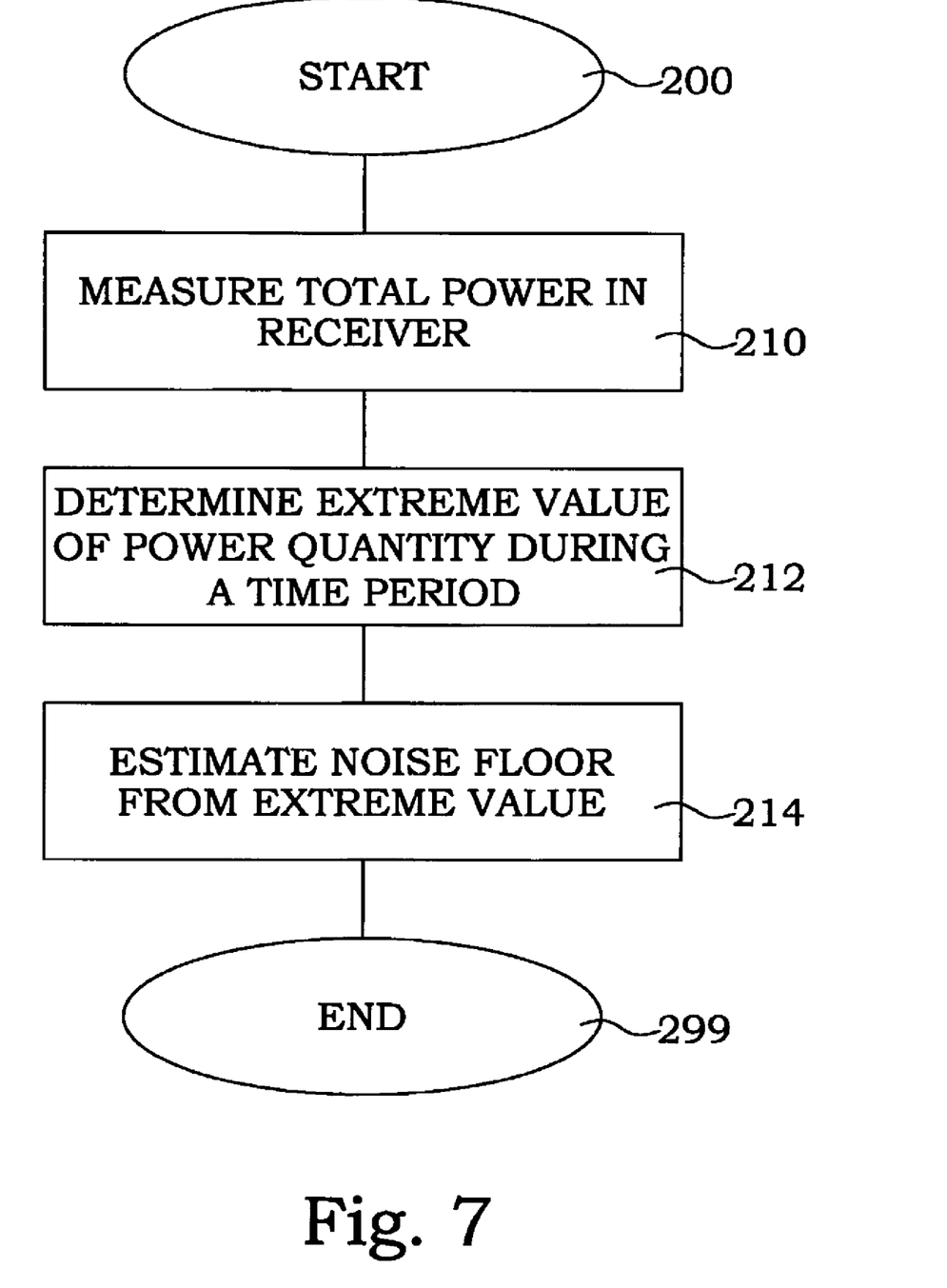
FIG. 7 is a flow diagram of main steps of an embodiment of a method according to the present invention.

FIG. 7 is a flow diagram of main steps of an embodiment of a method according to the present invention. The procedure starts in step 200. In step 210 an instantaneous total received wideband power is measured in a receiver. An extreme value, typically a minimum value, of a quantity being derived from the measurements during a time period is determined in step 212. In step 214, an upper limit of a thermal noise power level is estimated as being the determined extreme value. The procedure ends in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for thermal noise power estimation in a cellular telecommunications system, comprising the steps of:
   measuring instantaneous total received wideband power in a receiver and the instantaneous sum of powers of all links used in a cell of said cellular telecommunications system to which said receiver is associated;
   determining an extreme value of a difference between said total received wideband power over a period of time and said sum of powers of links used in said cell; and
   estimating an upper limit of a thermal noise power level as measured by said receiver from said extreme value.

2. The method according to claim 1, wherein said extreme value is a minimum value.

3. The method according to claim 1, wherein said time period is determined by a sliding window of a predetermined length.

4. A node in a cellular telecommunications system, comprising:
   means for obtaining measurements of the instantaneous total received wideband power in a receiver;
   means for obtaining measurements of the instantaneous sum of powers of all links used in a cell of said cellular telecommunications system to which said receiver is associated;
   means for determining an extreme value of a difference between said total received wideband power over a period of time and said sum of powers of links used in said cell; and,
   means for estimating an upper limit of a thermal noise power level as measured by said receiver from said extreme value.

5. The node according to claim 4, wherein said extreme value is a minimum value.

6. The node according to claim 4, wherein said node comprises said receiver and wherein said means for obtaining measurements of instantaneous total received wideband power being means for measuring said instantaneous total received wideband power in said receiver.

7. The node according to claim 4, wherein said time period is determined by a sliding window of a predetermined length.

8. The node according to claim 4, further comprising means for computing an estimate of an instantaneous noise rise as a ratio between said instantaneous total received wideband power and said upper limit of said thermal noise power level.

9. The node according to claim 4, further comprising means for controlling traffic in said cell based on said instantaneous noise rise.

10. The node according to claim 9, wherein said traffic is enhanced uplink traffic in a WCDMA type cellular system.

11. The node according to claim 4, wherein said node at least partially is comprised in a radio base station.

12. The node according to claim 4, wherein said node at least partially is comprised in a radio network controller.

* * * * *